United States Patent
Diard et al.

(10) Patent No.: US 7,388,581 B1
(45) Date of Patent: Jun. 17, 2008

(54) ASYNCHRONOUS CONDITIONAL GRAPHICS RENDERING

(75) Inventors: Franck R. Diard, Mountain View, CA (US); Paul V. Puey, Union City, CA (US)

(73) Assignee: NVIDIA Corporation, Santa Clara, CA (US)

( * ) Notice: Subject to any disclaimer, the term of this patent is extended or adjusted under 35 U.S.C. 154(b) by 45 days.

(21) Appl. No.: 10/652,608

(22) Filed: Aug. 28, 2003

(51) Int. Cl.
*G06T 15/40* (2006.01)
*G06T 15/00* (2006.01)
*G06T 1/00* (2006.01)

(52) U.S. Cl. .................. 345/421; 345/522; 345/501

(58) Field of Classification Search ............... 345/556, 345/552, 503, 421, 418, 502, 505, 501, 530, 345/522, 422
See application file for complete search history.

(56) References Cited

U.S. PATENT DOCUMENTS

| | | | |
|---|---|---|---|
| 5,579,455 A * | 11/1996 | Greene et al. | 345/422 |
| 6,118,452 A * | 9/2000 | Gannett | 345/418 |
| 6,259,461 B1 * | 7/2001 | Brown | 345/556 |
| 6,317,133 B1 * | 11/2001 | Root et al. | 345/503 |
| 6,362,818 B1 * | 3/2002 | Gardiner et al. | 345/421 |
| 6,445,391 B1 * | 9/2002 | Sowizral et al. | 345/421 |
| 6,670,955 B1 * | 12/2003 | Morein | 345/421 |

* cited by examiner

*Primary Examiner*—Kee M. Tung
*Assistant Examiner*—Joni Hsu
(74) *Attorney, Agent, or Firm*—Townsend and Townsend and Crew LLP

(57) ABSTRACT

A graphics processing unit implements conditional rendering by putting itself in a state in which it does not execute any rendering commands. Once the graphics processing unit is placed in this state, all subsequent rendering commands are ignored until another rendering command explicitly removes the graphics processing unit from this state. Conditional rendering commands enable the graphics processing unit to place itself in and out of this state based upon the value of a flag in memory. Conditional rendering commands can include conditions that must be satisfied by the flag value in order to change the state of the graphics processing unit. The value of the flag can be set by the graphics processing unit itself, a second graphics processing unit, a graphics coprocessor, or the central processing unit. This enables a wide variety of conditional rendering methods to be implemented.

17 Claims, 8 Drawing Sheets

ASYNCHRONOUS CONDITIONAL GRAPHICS RENDERING

BACKGROUND OF THE INVENTION

The present invention relates to the field of computer graphics. Many computer graphic images are created by mathematically modeling the interaction of light with a three dimensional scene from a given viewpoint. This process, called rendering, generates a two-dimensional image of the scene from the given viewpoint, and is analogous to taking a photograph of a real-world scene.

As the demand for computer graphics, and in particular for real-time computer graphics, has increased, computer systems with graphics processing subsystems adapted to accelerate the rendering process have become widespread. In these computer systems, the rendering process is divided between a computer's general purpose central processing unit (CPU) and the graphics processing subsystem. Typically, the CPU performs high level operations, such as determining the position, motion, and collision of objects in a given scene. From these high level operations, the CPU generates a set of rendering instructions and data defining the desired rendered image or images. For example, rendering instructions and data can define scene geometry, lighting, shading, texturing, motion, and/or camera parameters for a scene. The graphics processing subsystem creates one or more rendered images from the set of rendering instructions and data.

To maximize rendering performance, it is generally desirable for the CPU and graphics processing subsystem to execute the minimum number of operations necessary to render the images. Geometry culling optimizes the number of rendering operations by bypassing rendering operations for geometry and objects that are not visible in a scene. Typically, geometry culling performs one or more visibility tests on the geometry or object to be rendered. If the visibility test fails, the geometry or object will not be visible in the final rendered image; thus, rendering of the object can be bypassed. Conversely, if the geometry or object passes the visibility test, the object or geometry must be rendered (though the object may turn out to be hidden in the final rendered image). A number of different visibility tests of varying complexity and accuracy exist.

Conditionally rendering objects and geometry in a graphics processing subsystem presents a number of difficulties. First, the visibility of one object is often dependent upon other objects within a scene. Previously, it has been difficult for a graphics processing subsystem to use the results from rendering one object to conditionally render a subsequent object. Second, it is difficult for the CPU to assist the graphics processing subsystem in conditionally rendering objects. Typically, the CPU and graphics processing subsystem operate asynchronously to maximize performance. Once the scene description (a collection of rendering commands) is sent to the graphics processing subsystem, it is very hard for the CPU, in response to a visibility test, to intervene and cancel some of the rendering commands.

Third, completely CPU-based culling solutions are difficult and time-consuming to implement. For example, applications can use vertex shader programs to modify geometry positions. A CPU-based culling solution would be required to fully execute a vertex shader in order to determine whether or not a block of geometry can be culled. This would effectively eliminate any potential benefits from graphics processing subsystem accelerated geometry processing as the graphics processing subsystem would effectively be bottlenecked by the CPU's ability to execute vertex programs on geometric data. In addition, computation of vertex programs on the CPU steals cycles that could be used for application computations such as AI and physics calculations.

It is therefore desirable for a graphics processing subsystem to perform conditional rendering efficiently without assistance from the CPU. It is further desirable to seamlessly integrate the conditional rendering capabilities of the GPU with the CPU or other graphics processing subsystems, such as a second GPU or a graphics coprocessor, to perform more complicated visibility determinations.

BRIEF SUMMARY OF THE INVENTION

An embodiment of the invention implements conditional rendering by putting the graphics processing unit in a state in which it does not execute any rendering commands. Once the graphics processing unit is placed in this state, all subsequent rendering commands are ignored until another rendering command explicitly removes the graphics processing unit from this state. Conditional rendering commands enable the graphics processing unit to place itself in and out of this state based upon the value of a flag in memory. Conditional rendering commands can include conditions that must be satisfied by the flag value in order to change the state of the graphics processing unit. The value of the flag can be set by the graphics processing unit itself, a second graphics processing unit, a graphics coprocessor, or the central processing unit. This enables a wide variety of conditional rendering methods to be implemented.

An embodiment of the invention is a method for conditionally executing a rendering command by a graphics processing unit. In this embodiment, the graphics processing unit receives a conditional rendering command. In response to the conditional rendering command, the graphics processing unit retrieves a flag value. The graphics processing unit also receives a rendering command, and in response to the flag value, will disregard the rendering command.

In a further embodiment, the graphics processing unit disregards the rendering command in response to the flag value satisfying a condition. In one implementation, the condition is specified by the conditional rendering command. For example, a condition may be satisfied when the flag value matches a predetermined value, when the flag value is greater than a predetermined value, or when the flag value is less than a predetermined value.

In another embodiment, the graphics processing unit retrieves the flag value from a memory location. The memory location can be accessed using a memory address or a memory handle. In one implementation, the conditional rendering command specifies the memory location.

In yet another embodiment, the graphics processing unit receives a second conditional rendering command and a second rendering command. In response to the second conditional rendering command, the graphics processing unit executes the second rendering command. In an alternate embodiment, the graphics processing unit receives a second rendering command and executes the second rendering command when the second rendering command changes a state of the graphics processing unit.

In still another embodiment, the flag value is the result of a visibility determination of an object associated with the rendering command. In one implementation, the graphics processing unit determines the visibility of the object and stores a flag value in response to the result of the visibility determination of the object prior to receiving the conditional rendering command. In an embodiment, the flag value is a rendered pixel count. For example, the graphics processing unit may determine the visibility using a bounding box associated with the object, or by using a first rendering pass of the object. In alternate implementations, a second graphics processing unit, a graphics coprocessor, or central processing unit determines the visibility of the object and stores a flag value in response to the result of the visibility determination of the object.

BRIEF DESCRIPTION OF THE DRAWINGS

The invention will be described with reference to the drawings, in which.

DETAILED DESCRIPTION OF THE INVENTION

Figure 1:
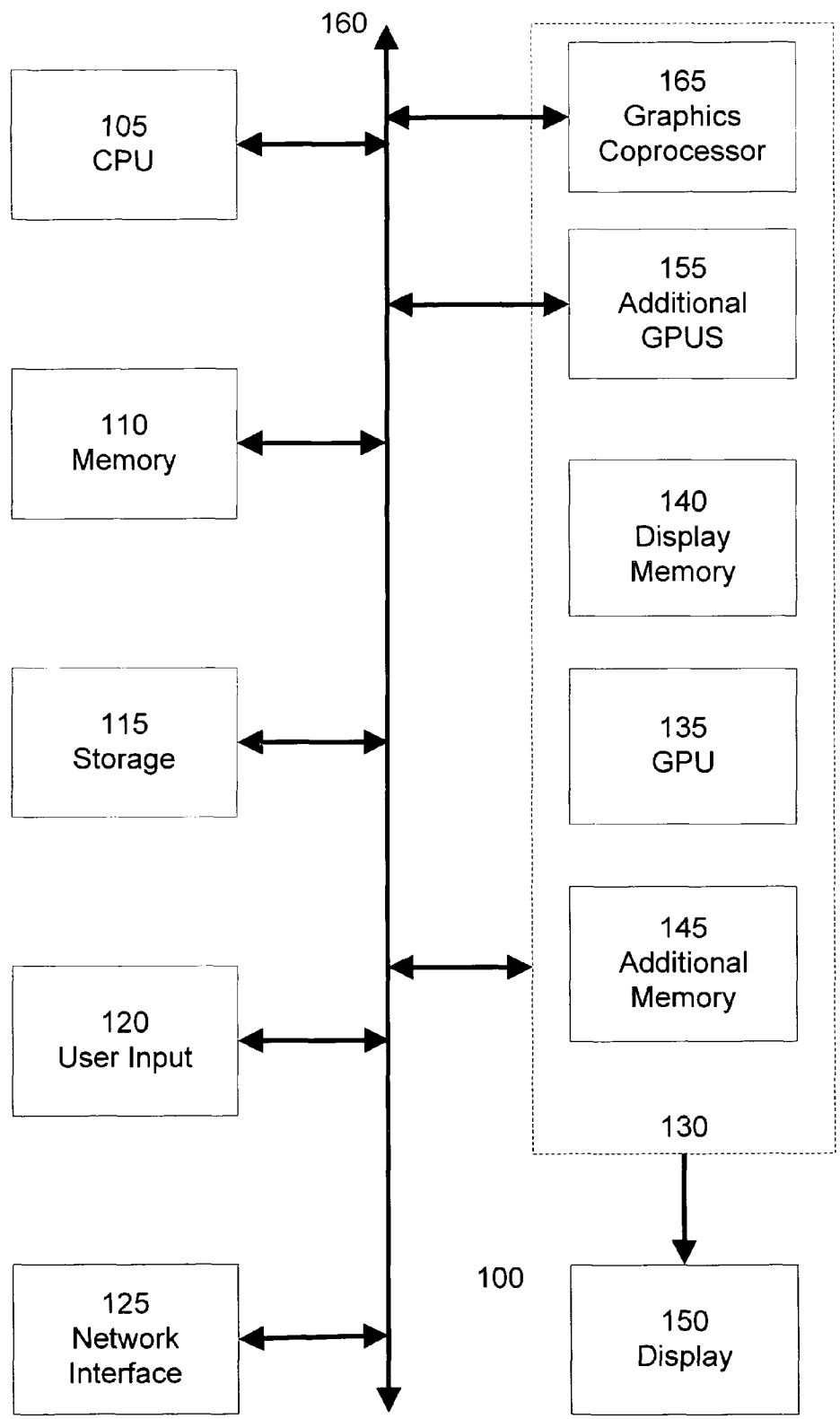
FIG. 1 is a block diagram of a computer system suitable for practicing an embodiment of the invention.

FIG. 1 is a block diagram of a computer system 100, such as a personal computer, video game console, personal digital assistant, or other digital device, suitable for practicing an embodiment of the invention. Computer system 100 includes a central processing unit (CPU) 105 for running software applications and optionally an operating system. In an embodiment, CPU 105 is actually several separate central processing units operating in parallel. Memory 110 stores applications and data for use by the CPU 105. Storage 115 provides non-volatile storage for applications and data and may include fixed disk drives, removable disk drives, flash memory devices, and CD-ROM, DVD-ROM, or other optical storage devices. User input devices 120 communicate user inputs from one or more users to the computer system 100 and may include keyboards, mice, joysticks, touch screens, and/or microphones. Network interface 125 allows computer system 100 to communicate with other computer systems via an electronic communications network, and may include wired or wireless communication over local area networks and wide area networks such as the Internet. The components of computer system 100, including CPU 105, memory 110, data storage 115, user input devices 120, and network interface 125, are connected via one or more data buses 160. Examples of data buses include ISA, PCI, AGP, PCI, PCI-X, and Hypertransport data buses.

A graphics subsystem 130 is further connected with data bus 160 and the components of the computer system 100. The graphics subsystem 130 includes a graphics processing unit (GPU) 135 and graphics memory. Graphics memory includes a display memory 140 (e.g., a frame buffer) used for storing pixel data for each pixel of an output image. Pixel data can be provided to display memory 140 directly from the CPU 105. Alternatively, CPU 105 provides the GPU 135 with data and/or commands defining the desired output images, from which the GPU 135 generates the pixel data of one or more output images. The data and/or commands defining the desired output images is stored in additional memory 145. In an embodiment, the GPU 135 generates pixel data for output images from rendering commands and data defining the geometry, lighting, shading, texturing, motion, and/or camera parameters for a scene.

In another embodiment, display memory 140 and/or additional memory 145 are part of memory 110 and is shared with the CPU 105. Alternatively, display memory 140 and/or additional memory 145 is one or more separate memories provided for the exclusive use of the graphics subsystem 130. The graphics subsystem 130 periodically outputs pixel data for an image from display memory 218 and displayed on display device 150. Display device 150 is any device capable of displaying visual information in response to a signal from the computer system 100, including CRT, LCD, plasma, and OLED displays. Computer system 100 can provide the display device 150 with an analog or digital signal.

In a further embodiment, graphics processing subsystem 130 includes one or more additional GPUs 155, similar to GPU 135. In an even further embodiment, graphics processing subsystem 130 includes a graphics coprocessor 165. Graphics processing coprocessor 165 and additional GPUs 155 are adapted to operate in parallel with GPU 135. Additional GPUs 155 generate pixel data for output images from rendering commands, similar to GPU 135. Additional GPUs 155 can operate in conjunction with GPU 135 to simultaneously generate pixel data for different portions of an output image, or to simultaneously generate pixel data for different output images. In an embodiment, graphics coprocessor 165 performs rendering related tasks such as geometry transformation, shader computations, and backface culling operations for GPU 135 and/or additional GPUs 155.

Additional GPUs 150 can be located on the same circuit board as GPU 135 and sharing a connection with GPU 135 to data bus 160, or can be located on additional circuit boards separately connected with data bus 160. Additional GPUs 155 can have their own display and additional memory, similar to display memory 140 and additional memory 145, or can share memories 140 and 145 with GPU 135. In an embodiment, the graphics coprocessor 165 is integrated with the computer system chipset (not shown), such as with the Northbridge chip used to control the data bus 160.

Figure 2:
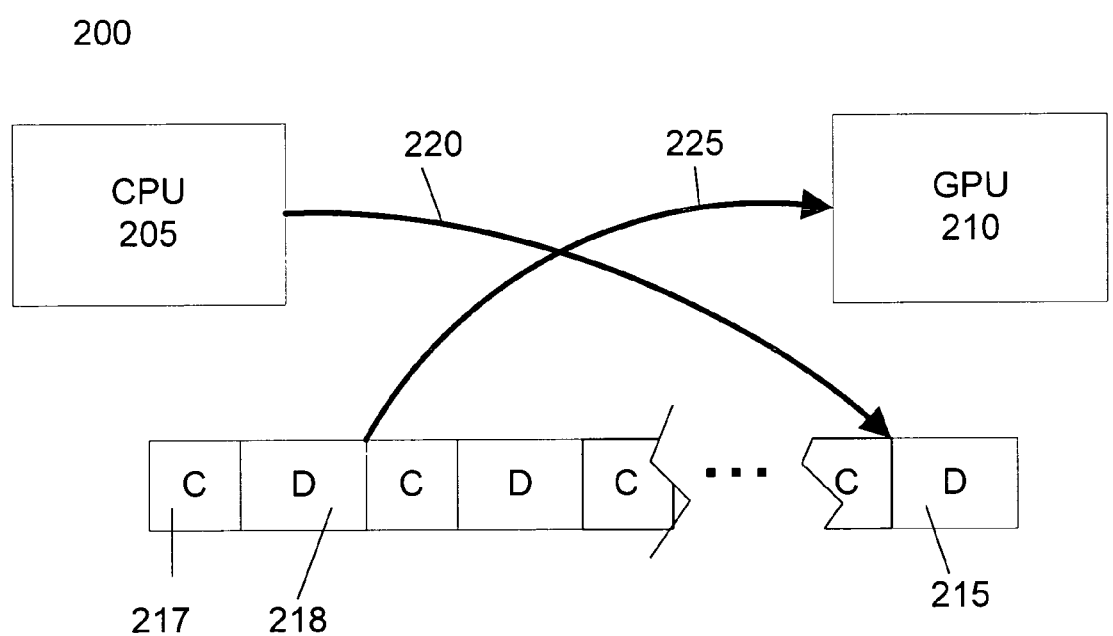
FIG. 2 illustrates a system for communicating rendering commands from a central processing unit (CPU) to a graphics processing unit (GPU) suitable for practicing an embodiment of the invention.

FIG. 2 illustrates a system 200 for communicating rendering commands from a central processing unit (CPU) 205 to a graphics processing unit (GPU) 210 suitable for practicing an embodiment of the invention. In this embodiment, the CPU 205 and the GPU 210 communicate asynchronously through a command buffer 215. Command buffer 215 is stored in memory accessible to both the CPU 205 and the GPU 210. In an embodiment, the command buffer 215 is stored in the computer system's general memory, such as memory 110 discussed in FIG. 1, and is accessible to the GPU 215 via direct memory access (DMA) transfers. Although not shown in FIG. 2, each GPU in a system with multiple GPUs and/or graphics coprocessors uses a similar command buffer for receiving communications from the CPU 205.

Command buffer 215 stores sets of rendering commands, such as rendering command 317, and sets of rendering data, such as rendering data 218. In one embodiment, a rendering command is associated with rendering data. The rendering command defines the set of rendering processes to be performed by the GPU on an associated rendering data. In a further embodiment, the rendering data is stored in the command buffer 215 adjacent to the corresponding rendering command.

The CPU 205 writes rendering commands and data sets to the command buffer 215. The command buffer 215 can include a number of rendering commands and data sets. The CPU 205 writes commands and data sets into the command buffer 215 at the location determined by "put" pointer 220. Following each CPU write into the command buffer 215, the CPU 205 increments the put pointer 220 to the next unused location in the command buffer 215. In an embodiment, a driver software program executed by the CPU 205 translates high-level rendering commands from a rendering application into commands and data sets, which are then written into the command buffer 215. In a further embodiment, the driver software program receives high-level rendering commands via an application programming interface, for example DirectX™ or OpenGL™.

The GPU 210 reads commands and data sets from the command buffer 215. The GPU 210 reads commands and data sets from the command buffer 215 at the location determined by "get" pointer 225. Following each GPU read from the command buffer 215, the GPU 210 increments the get pointer 225 to the location of the next command or data set in the command buffer 215.

The CPU 205 and GPU 210 can access the command buffer independently. In an embodiment, the CPU 205 periodically adds new commands and data sets to the command buffer 215. Simultaneously, the GPU 210 reads processes commands and data sets previously stored by the CPU 205 continuously. Provided the CPU 205 stays sufficiently far ahead of the GPU 210, the GPU 210 is able to render images without any idle time waiting for the CPU 205. In an embodiment, the CPU 205 writes commands and data sets for frames several frames ahead of the frame being rendered by the GPU 210.

In an embodiment, the command buffer is limited in size. As an example, a typical command buffer is five megabytes in size. When either the get pointer 225 or put pointer 220 reaches the end of the command buffer 215, the pointer is reset to the location of the beginning of the command buffer 215. In this manner, the command buffer 215 "wraps around," enabling the CPU and GPU to access the command buffer 215 in a continuous loop.

Figure 3:
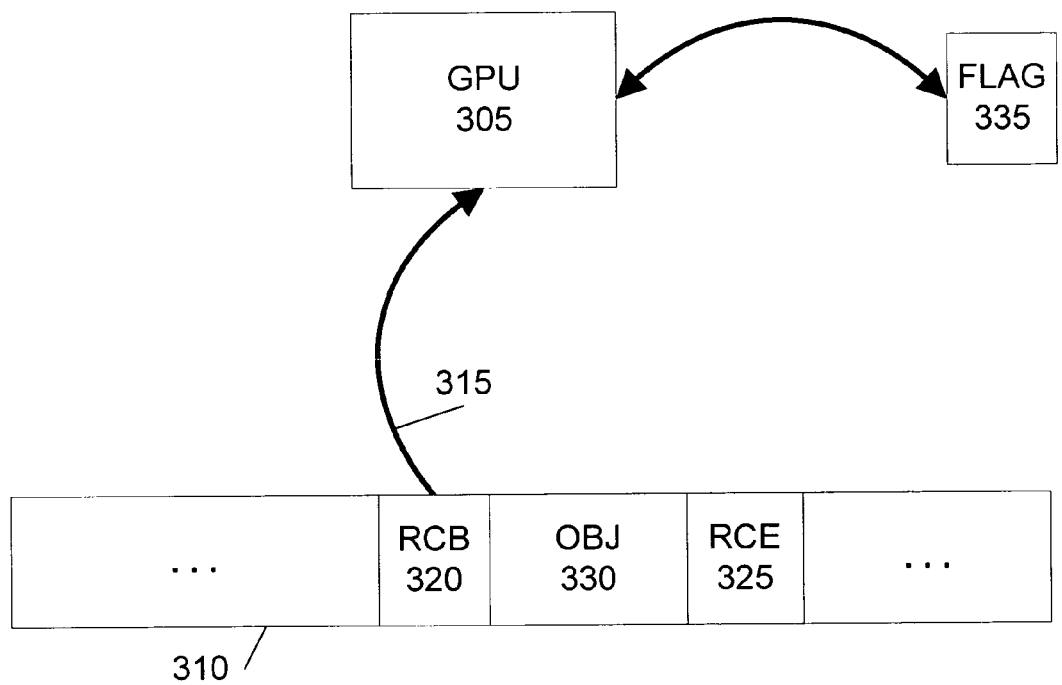
FIG. 3 illustrates a system and method for enabling a GPU to perform conditional rendering according to an embodiment of the invention.

FIG. 3 illustrates a system and method enabling a GPU to perform conditional rendering according to an embodiment of the invention. GPU 305 retrieves and executes rendering commands and data from command buffer 310 via get pointer 315, as described above. RCB, 320, is a new rendering instruction that defines the beginning of a set of rendering commands 330 to be conditionally rendered. For example, rendering commands 330 can be associated with one or more objects that will be rendered if a condition, such as a visibility test, is satisfied. Similarly, rendering command RCE 325 defines the end of a set of rendering commands 300 to be conditionally rendered.

Upon retrieving RCB command 320, GPU 305 reads the value of a flag 335 stored in memory. In an embodiment, the flag 335 is stored in main system memory. In an alternate embodiment, flag 335 is stored in memory associated with the GPU 305. In an embodiment, RCB command 320 specifies the location of the flag 335. The location of flag 335 can be specified by all or part of a memory address, or alternatively by a memory handle. A memory handle typically is an index value into an array of memory pointers. Each array element points to the memory location containing the flag value.

In response to the value of flag 335, the GPU 305 either executes or ignores the rendering commands 330 between the RCB 320 and RCE 325 commands. It should be noted that the RCB command instructs the GPU 305 only to ignore rendering commands resulting in rendering output. Regardless of the value of flag 335, the GPU 305 will continue to process rendering commands determining program flow, such as jumping and branching operations, setting the state of the GPU 305, and other commands, such as additional RCB and RCE. This ensures that the GPU maintains a consistent operating state regardless of the value of the flag 335. In an embodiment, the GPU 305 will evaluate the value of flag 335 according to a condition specified by the RCB command 320 to determine whether to execute the set of rendering commands 330. The RCB command 320 can specify a number of different conditions that can be used for this determination.

For example, RCB command 320 can specify a "EQUAL" condition, which instructs the GPU 305 to render commands 330 if the flag 335 is equal to a number specified by RCB command 320. Similarly, RCB command 320 can specify a "LESS THAN" or "GREATER THAN" condition, which instructs the GPU 305 to render commands 330 if the flag 335 is less than or greater than, respectively, a number specified by RCB command 320. In a further embodiment, RCB command 320 can specify a "FALSE" condition, which instructs the GPU 305 to ignore rendering commands 330 regardless of the value of the flag 335, and a "TRUE" condition, which instructs the GPU 305 to execute any subsequent rendering commands until instructed otherwise, such as via another RCB command. In an embodiment, an RCE command 325 is equivalent to an RCB command with a "TRUE" condition.

As discussed below, the flag 335 can be set by the GPU 305, a second GPU or graphics coprocessor operating in parallel with GPU 305, or by the CPU running a rendering application or a device driver. The flexibility in setting the value of flag 335 enables the implementation of a number of different conditional rendering operations.

Figure 4:
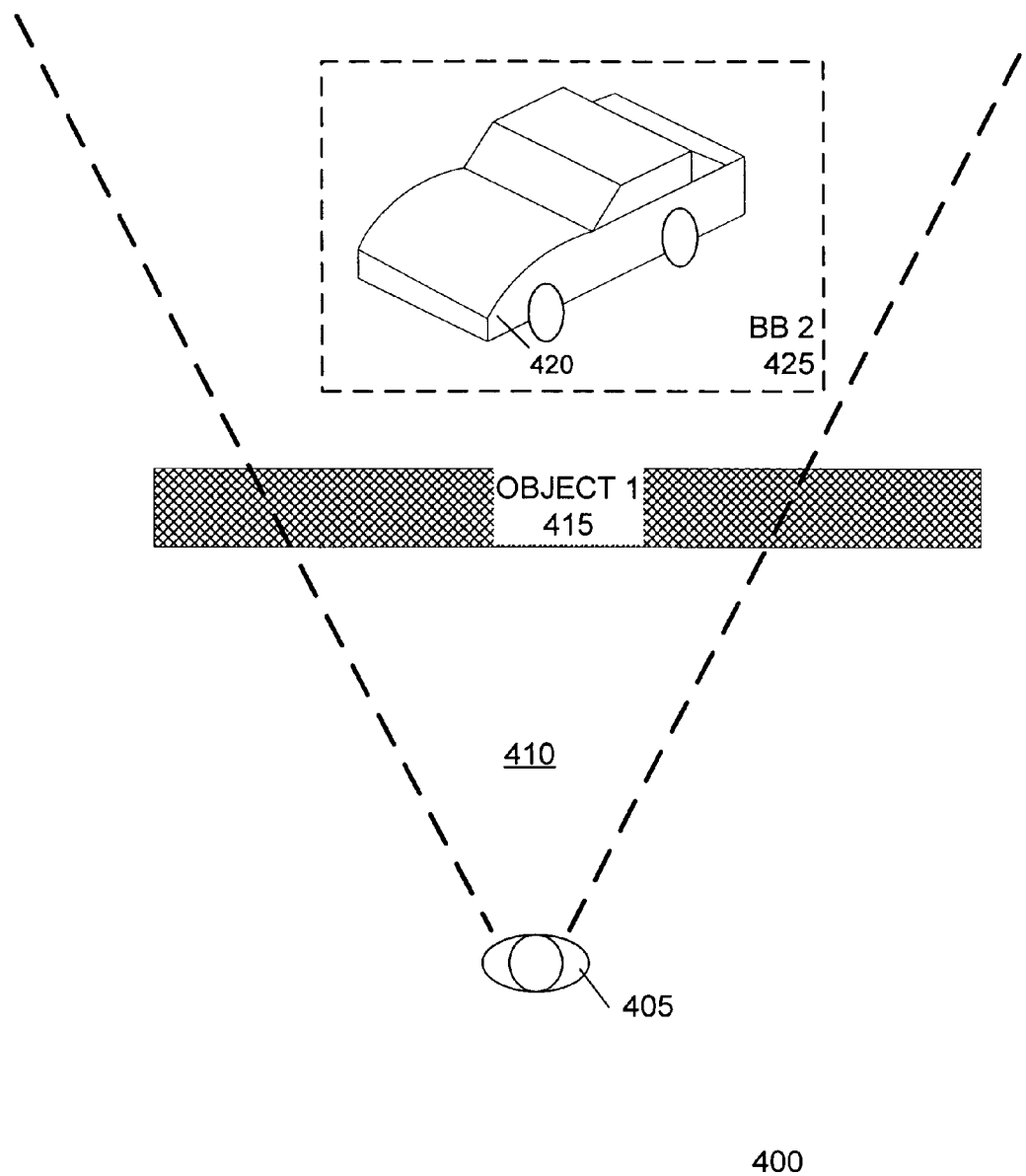
FIG. 4 illustrates an example scene in which conditional rendering can be implemented according to several embodiments of the invention.

FIG. 4 illustrates an example scene 400 in which conditional rendering can be implemented according to several embodiments of the invention. Example scene 400 includes a camera 405 defining the user's view 410 of the scene 400. Within the view 410 is a first object 415 and a second object 420. A bounding box 425 completely encloses the second object 420 and can be used to quickly determine the visibility of the second object 425. For example, if a rendering application determines that the bounding box 425 is completely obscured by object 415 when rendering view 410 of the scene 400, then it follows that the second object 420 is also not visible and therefore does not need to be rendered. Generally, bounding box 425 has much simpler geometry than object 420, and therefore it takes less time to determine the visibility of bounding box 425 than to render object 420.

Figure 5A:
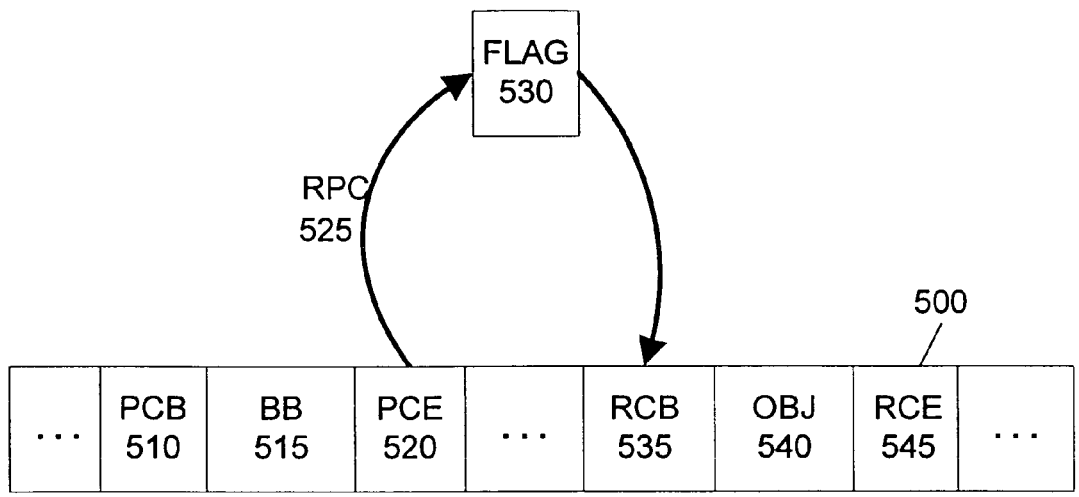
FIGS. 5A and 5B illustrate several implementations of conditional rendering according to different embodiments of the invention.

FIG. 5 illustrates several implementations of conditional rendering according to different embodiments of the invention. FIG. 5A illustrates a first implementation of conditional rendering. In this implementation, a GPU conditionally renders an object based upon the visibility of the object's bounding box.

A command buffer 500 includes a sequence of rendering commands for execution by the GPU. A pixel count render begin (PCB) command 510 instructs the GPU to process subsequent rendering commands without writing to any color, depth, or alpha buffers, effectively making the subsequent rendering commands "invisible." However, the GPU will compare the output of subsequent rendering commands with the view frustum, the depth buffer, and any other visibility tests, such as a stencil buffer, as if the subsequent rendering commands were actually rendering to the color buffer. Additionally, the GPU still counts the number of pixels that would have been rendered to color buffer.

Following PCB command 510, rendering commands 515 defining a bounding box for an object are processed by the GPU. Because rendering commands 515 were preceded by PCB command 510, the bounding box will be rendered by the GPU, but not written to the color buffer or the depth buffer.

Following rendering commands 515, a pixel count render end (PCE) command 520 re-enables writes to the color and depth buffer, so that subsequent rendering commands will be rendered normally. PCE command 520 additionally writes the rendered pixel count (RPC) 525, which is the number of visible pixels, resulting from the rendering to flag 530. In an embodiment, PCE command 520 specifies the location of flag 530 using all or part of a memory address, or alternatively by a memory handle. If the RPC is zero following the processing of rendering commands 515, then the bounding box is completely obscured in the rendered scene; therefore, the object associated with the bounding box does not need to be rendered. In an alternate embodiment, rendering of an object is skipped if only a small number of pixels of the bounding box are visible.

The rendered pixel count value 525 stored in flag 530 can be used to enable or disable rendering of the object associated with the bounding box. A render conditional begin (RCB) command 535, similar to that described above, retrieves the value of flag 530. The RCB command 535 includes a condition adapted to disable rendering if the flag equals a given value, such as "EQUALS 0." If the value of the flag 530 satisfies this condition, then the GPU will ignore rendering commands 540, which define the object associated with the bounding box. This results in the object not being rendered by the GPU. Conversely, if the value of flag 530 does not satisfy the condition specified by RCB 535, rendering commands 540 will be processed normally by the GPU, resulting in the rendering of the object. A RCE command 545 follows rendering commands 540 to re-enable all rendering regardless of the value of the flag 530.

In this manner, an object will not be rendered when its associated bounding box is not visible. An advantage of this implementation is that all of the commands in command buffer 500 can be sent to the GPU by the rendering application or device driver well in advance of the actual rendering. Neither the rendering application or device driver need to determine the visibility of the object, nor do they need to intervene during rendering to cancel unnecessary rendering commands.

Figure 5B:
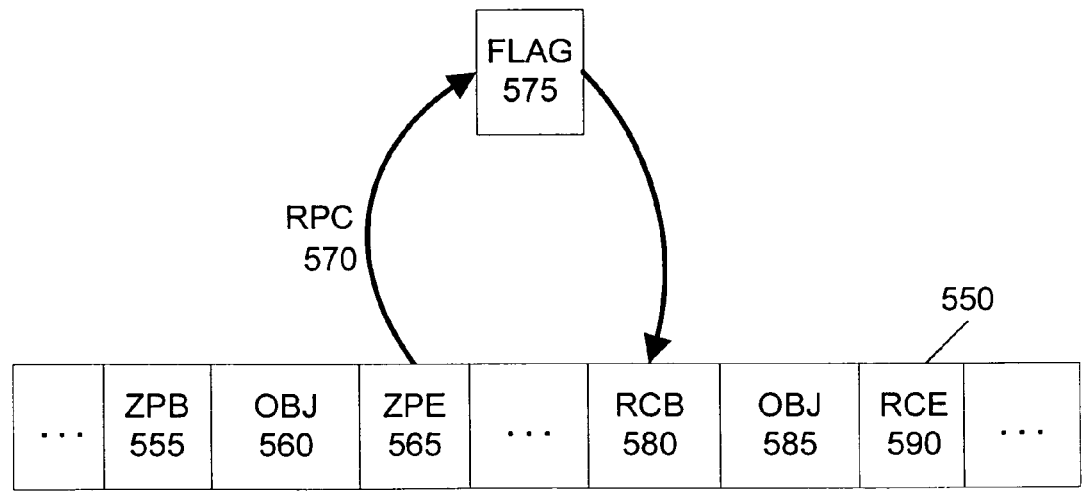

For some rendering applications, two or more rendering passes are needed to render an object. For example, a first rendering pass may be used to fill a depth buffer and a stencil buffer. The values of the depth and stencil buffers are then used for a second rendering pass to fill a color buffer with the correct lighting and shading values for the objects. FIG. 5B illustrates another implementation of conditional rendering in which multiple rendering passes are used to determine an objects visibility.

A command buffer 550 includes a sequence of rendering commands for execution by the GPU. A z-pass render begin (ZPB) command 555 instructs the GPU to process subsequent rendering commands writing only to the depth buffer. This enables the GPU to fill the depth buffer with the appropriate values to be used in a second rendering pass for lighting and shading.

Following ZPB command 555, rendering commands 560 defining an object are processed by the GPU. Because rendering commands 560 were preceded by ZPB command 555, the object will be rendered by the GPU to the depth buffer, but not to the color buffer. Additionally, the GPU still counts the number of pixels rendered to depth buffer.

Following rendering commands 560, a z-pass render end (ZPE) command 565 re-enables writes to the color buffer, so that subsequent rendering commands will be rendered normally. ZPE command 565 additionally writes the rendered pixel count (RPC) 570, which is the number of visible pixels, resulting from the rendering to flag 575. In an embodiment, ZPE command 565 specifies the location of flag 575 using all or part of a memory address, or alternatively by a memory handle. If the RPC is zero following the processing of rendering commands 560, then the object is completely obscured in the rendered scene; therefore, the object does not need to be rendered for the second rendering pass.

The rendered pixel count value 570 stored in flag 575 can be used to enable or disable rendering of the object in the second rendering pass. A render conditional begin (RCB) command 580, similar to that described above, retrieves the value of flag 575. The RCB command 580 includes a condition adapted to disable rendering if the flag equals a given value, such as "EQUALS 0." If the value of the flag 580 satisfies this condition, then the GPU will ignore rendering commands 585, which define the rendering of the object for the second rendering pass. This results in the object not being rendered by the GPU for the second rendering pass. Conversely, if the value of flag 575 does not satisfy the condition specified by RCB 580, rendering commands 585 will be processed normally by the GPU, resulting in the rendering of the object with its lighting and shading. A RCE command 590 follows rendering commands 590 to re-enable all rendering regardless of the value of the flag 575.

In this manner, an object will not be rendered in a second rendering pass when its is not visible in the first rendering pass. An advantage of this implementation is that all of the commands in command buffer 550 can be sent to the GPU by the rendering application or device driver well in advance of the actual rendering. Neither the rendering application or device driver need to determine the visibility of the object, nor do they need to intervene during rendering to cancel unnecessary rendering commands. Additionally, bounding boxes do not need to be created for each object. Moreover, because lighting and shading calculations in the second rendering pass can be very time-consuming compared with the rendering of depth only in the first rendering pass, the performance improvements from this implementation can be very substantial.

Figure 6:
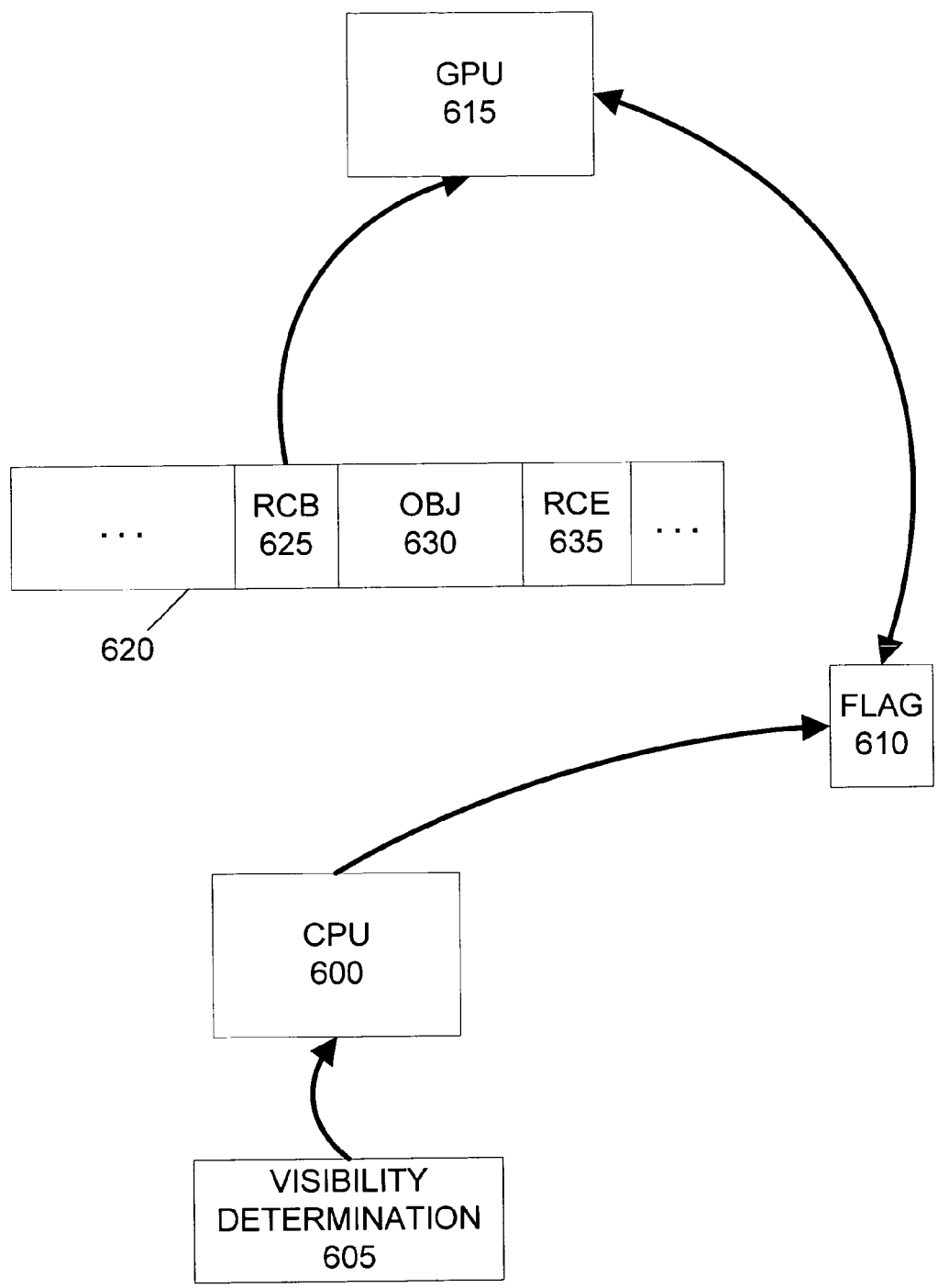
FIG. 6 illustrates a CPU assisting a GPU with conditional rendering according to an embodiment of the invention.

FIG. 6 illustrates a CPU assisting a GPU with conditional rendering according to an embodiment of the invention. A command buffer 620 includes a set of commands to be processed by the GPU 615. The command buffer includes a set of rendering commands 630 defining an object surrounded by RCB 625 and RCE 635 commands. In an embodiment, the CPU 600 sends the commands 625, 630, and 635 to the GPU 615 via the command buffer 620 well in advance of their rendering.

While GPU 615 is processing the commands preceding RCB command 625, the CPU performs a visibility determination 605 of the object. Any type of visibility algorithm can be used for the visibility determination 605, such as bounding boxes, frustum culling, octrees, or binary space partitioning (BSP) trees. Because the visibility determination 605 is performed by the CPU 600, rather than the GPU 615, complicated or highly specialized visibility algorithms can employed that would normally be impractical to implement with the GPU 615 alone.

Following the completion of the visibility determination 605 for an object, the CPU writes a value to the flag 610. The value written to flag 610 indicates the result of the visibility determination 605. For example, a zero may indicate that the object is not visible, while a non-zero value may indicate that the object is visible.

Upon executing RCB command 625, the GPU 615 retrieves the value of the flag 610. As discussed above, the RCB command 625 specifies the location of flag 610 using all or part of a memory address, or alternatively by a memory handle. This location is determined in advance when the CPU 600 sends the RCB command 625 to the command buffer 620. In response to the value of the flag 610, the GPU 615 will either ignore or execute rendering commands 630. Following rendering commands 635, a RCE command 635 re-enables all rendering regardless of the value of the flag 610.

In a further embodiment, the GPU 615 and CPU 600 operate asynchronously. In this embodiment, there is no way to ensure that the CPU finishes the visibility determination 605 and writes the appropriate value to the flag 610 prior to the GPU 615 executing the RCB command 625. To ensure that the final rendered image is always correct, the CPU 600 sets the flag 610 to an initial default value at the same time the RCB command 625 is sent to the command buffer 620. The initial default value is set so that the GPU 615 will execute rendering commands 630. If the GPU then executes RCB command 625 prior to the completion of the visibility determination 605, the value of the flag 610 will indicate that rendering commands 630 should be executed. If the CPU 600 finishes the visibility determination 605 prior to the execution of RCB command 625 and the object is not visible, then the CPU will change the value of the flag 610 so that the GPU will ignore rendering commands 630.

Figure 7:
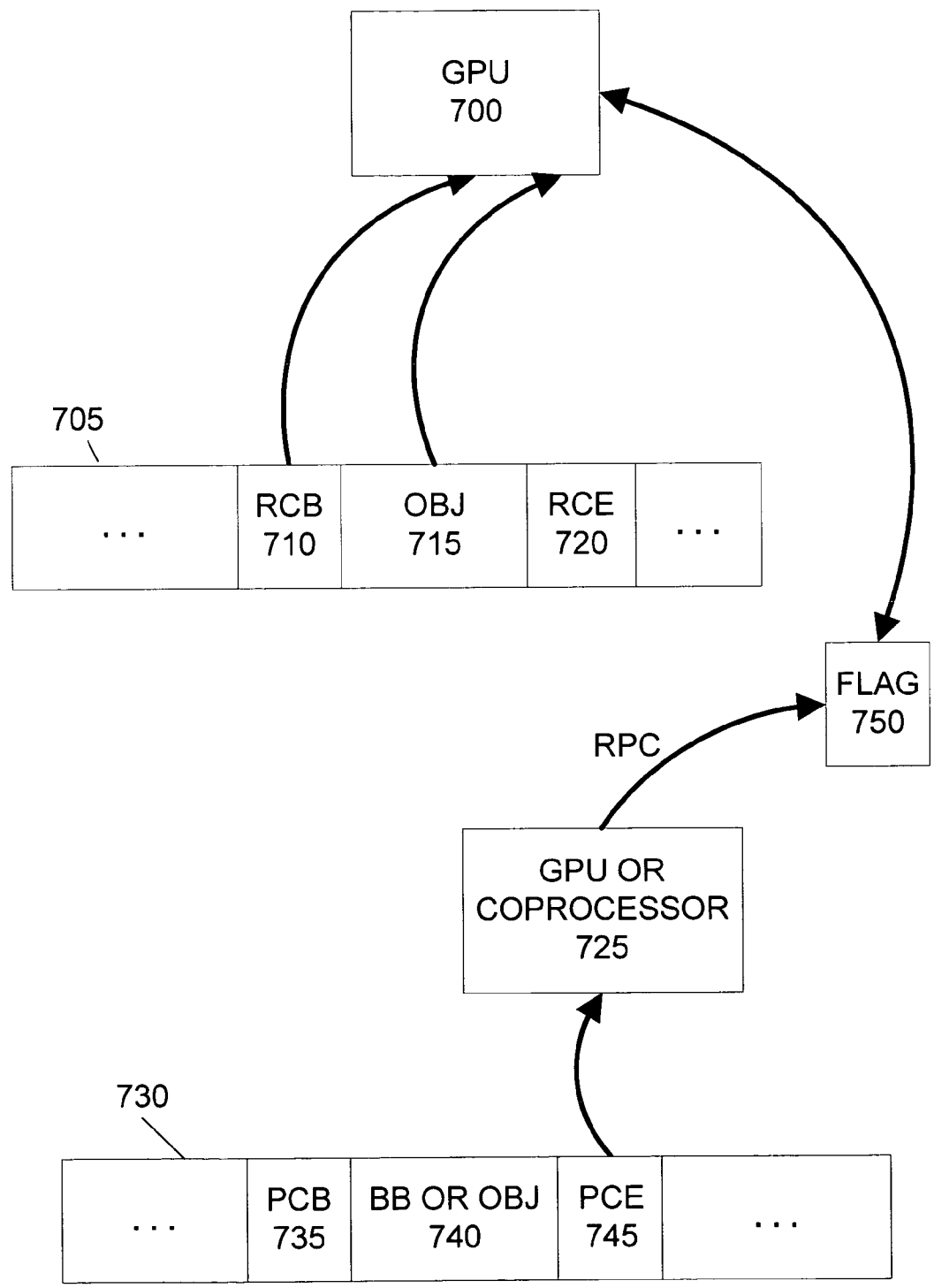
FIG. 7 illustrates a second GPU or graphics coprocessor assisting a first GPU with conditional rendering according to an embodiment of the invention.

FIG. 7 illustrates a second GPU or graphics coprocessor assisting a first GPU with conditional rendering according to an embodiment of the invention. A first GPU 700 receives commands via command buffer 705. Command buffer 705 includes a set of rendering commands 715 defining an object surrounded by RCB 710 and RCE 720 commands.

While GPU 700 is processing the commands preceding RCB command 710, a second GPU or graphics coprocessor 725 operates in parallel to execute commands from command buffer 730. Command buffer 730 includes a set of rendering commands 740 defining either a copy of the object or a bounding box associated with the object. The set of rendering commands 740 is surrounded by PCB 735 and PCE 745 commands. The purpose of commands 735 and 745 is to determine the visibility of the object or bounding box rendered by the set of rendering commands 740. This is done by tracking the number of rendered pixels resulting from the execution of rendering commands 740. In an embodiment, other commands tracking the number of rendered pixels, such as the ZPB and ZPE commands discussed above, can be used for commands 735 and 745.

Following the completion of the visibility determination for the object or bounding box, the second GPU or graphics coprocessor 725 writes a value to the flag 750. Command 735 or 745 specifies the location of flag 750 using all or part of a memory address, or alternatively by a memory handle. The value written to flag 750 indicates the result of the second GPU or graphics coprocessor's 725 visibility determination. For example, a zero may indicate that the object is not visible, while a non-zero value may indicate that the object is visible.

Upon executing RCB command 710, the GPU 700 retrieves the value of the flag 750. As discussed above, the RCB command 710 specifies the location of flag 750 using all or part of a memory address, or alternatively by a memory handle. This location is determined in advance when the CPU programs both GPU 700 and GPU or graphics coprocessor 725. In response to the value of the flag 750, the GPU 700 will either ignore or execute rendering commands 715. Following rendering commands 715, a RCE command 720 re-enables all rendering regardless of the value of the flag 750.

In a further embodiment, the GPU 700 and GPU or graphics coprocessor 725 operate asynchronously. In this embodiment, there is no way to ensure that the second GPU or graphics coprocessor finishes the visibility determination and writes the appropriate value to the flag 750 prior to the GPU 700 executing the RCB command 710. To ensure that the final rendered image is always correct, the flag 750 is set to an initial default value at the same time the RCB command 710 is sent to the command buffer 705. The initial default value is set so that the GPU 700 will execute rendering commands 715. If the GPU or graphics coprocessor 725 finishes the visibility determination prior to the execution of RCB command 710 by GPU 700 and the object is not visible, then the value of the flag 750 will be changed so that the GPU 700 will ignore rendering commands 715.

Figure 8A:
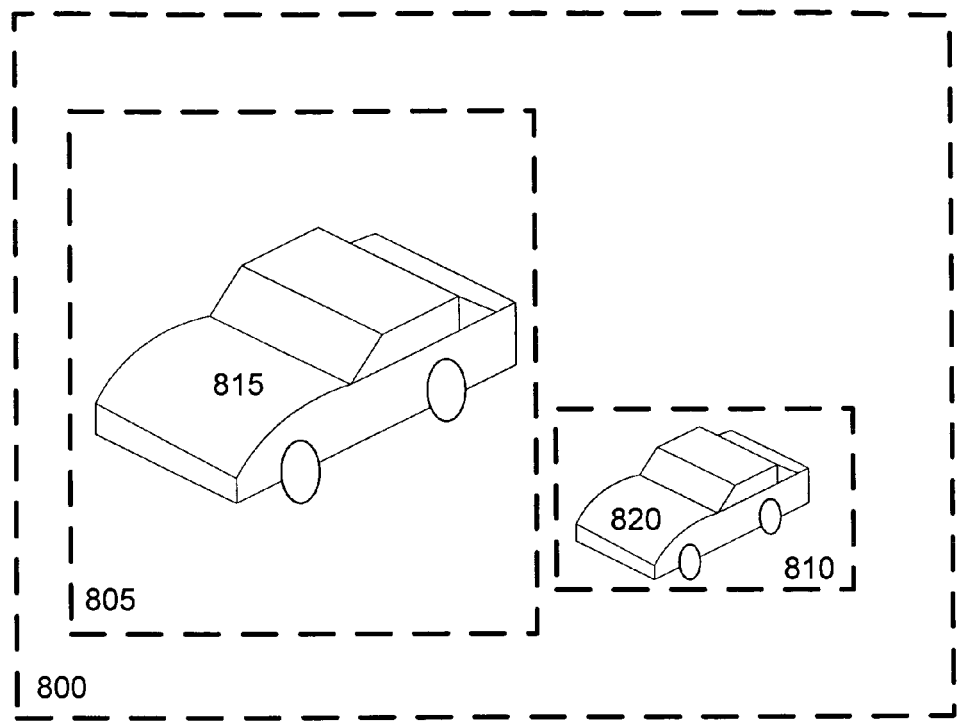
FIGS. 8A and 8B illustrate an example scene and implementation of nested conditional rendering according to an embodiment of the invention.
Figure 8B:
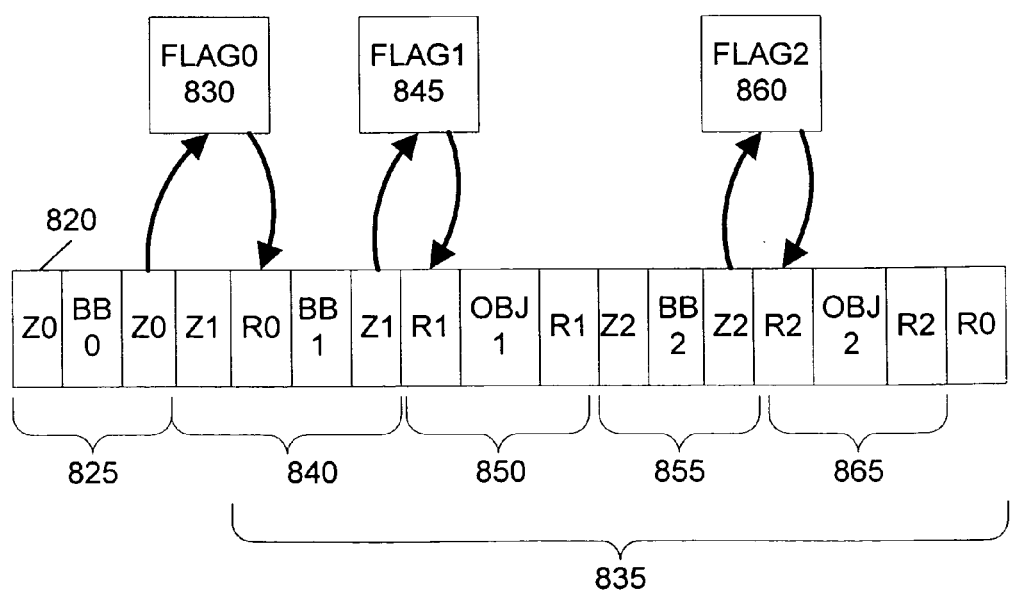

FIGS. 8A and 8B illustrate an example scene and implementation of nested conditional rendering according to an embodiment of the invention. In FIG. 8A, a first bounding box 800 includes two smaller bounding boxes 805 and 810. Bounding box 805 contains object 815 and bounding box 810 contains 820. In this example scene, if bounding box 800 is not visible, then objects 815 and 820 do not need to be rendered. If bounding box 800 is visible, then the visibility of bounding boxes 805 and 810 can be tested to determine whether to render objects 815 and 820.

FIG. 8B illustrates a set of commands 820 implementing the rendering of the example scene of FIG. 8A according to an embodiment of the invention. This embodiment utilizes the ability to nest multiple conditional rendering commands and visibility tests within each other. A first set of commands 820 determine the visibility of bounding box 800, using for example PCB and PCE commands to count the number of rendered pixels from the bounding box. The results of the visibility determination of bounding box 800 are written to flag 830.

A RCB command at the beginning of the command set 835 reads the value of flag 830. If the value of the flag 830 indicates that bounding box 800 is not visible, for example if flag 830 equals zero, the GPU ignores the remaining commands in command set 835. This results in the objects 815 and 820 not being rendered.

Conversely, if the value of flag 830 indicates that bounding box 800 is visible, command set 840 determines the visibility of bounding box 805, in a manner similar to command set 825. The results of the visibility determination of bounding box 805 are written to flag 845. A RCB command at the beginning of the command set 850 reads the value of flag 845. If the value of the flag 845 indicates that bounding box 805 is not visible, the GPU ignores the remaining commands in command set 850. This results in the object 815 not being rendered. Otherwise, object 815 is rendered.

Regardless of the value of flag 845, command set 855 determines the visibility of bounding box 810, in a manner similar to command sets 825 and 840. The results of the visibility determination of bounding box 810 are written to flag 860. A RCB command at the beginning of the command set 865 reads the value of flag 860. If the value of the flag 860 indicates that bounding box 810 is not visible, the GPU ignores the remaining commands in command set 865. This results in the object 820 not being rendered. Otherwise, object 820 is rendered.

It should be noted that each flag can be addressed using a memory address or memory handle specified by the RCB and PCE or ZPE commands, as described above. In an alternate embodiment, the visibility of one or more of the bounding boxes can be determined using the implementations discussed in FIG. 6 or 7.

This invention provides a system for performing conditional rendering efficiently without assistance from the CPU. It is further allows for seamless integration of the conditional rendering capabilities of the GPU with the CPU or other graphics processing subsystems, such as a second GPU or a graphics coprocessor, to perform more complicated visibility determinations. Although the invention has been discussed with respect to specific examples and embodiments thereof, these are merely illustrative, and not restrictive, of the invention. Thus, the scope of the invention is to be determined solely by the claims.

What is claimed is:

1. A method of conditionally executing a rendering command by a graphics processing unit, the method comprising:
   determining visibility of an object associated with a first rendering command to produce a flag value based at least in part on the visibility;
   receiving a conditional rendering initiation command from a central processing unit subsequent to the determination of the visibility, the conditional rendering initiation command specifying a condition for determining whether the first rendering command will be executed;
   in response to the conditional rendering initiation command, retrieving the flag value;
   receiving the first rendering command subsequent to the conditional rendering initiation command from the central processing unit;
   in response to the flag value, determining whether to execute or disregard the first rendering command based at least in part on whether the flag value satisfies the condition specified in the conditional rendering initiation command; and
   disregarding the first rendering command.

2. The method of claim 1, wherein,
   the produced flag value is one of at least three flag values available in the determination of visibility; and
   the first rendering command is disregarded in response to the flag value satisfying the condition.

3. The method of claim 2, wherein,
   the flag value indicates that the object is at least partially visible; and
   the conditional rendering initiation command specifies the condition indicating when a rendering command for a partially visible object is to be disregarded.

4. The method of claim 1, wherein the flag value is retrieved from a memory location.

5. The method of claim 1, further comprising:
   receiving a second rendering command subsequent to the conditional rendering initiation command from the central processing unit; and
   executing the second rendering command regardless of the flag value in the event that the second rendering command changes a state of the graphics processing unit.

6. The method of claim 1, wherein,
   the flag value is a rendered pixel count; and
   the conditional rendering initiation command specifies the condition comprising a threshold pixel count indicating when a rendering command for a partially visible object is to be disregarded.

7. The method of claim 1, wherein a second graphics processing unit:
   performs the determining visibility step; and
   performs a further step comprising
   storing a flag value in response to the result of the visibility determination of the object.

8. The method of claim 1, wherein a graphics coprocessor:
   performs the determining visibility step; and
   performs a further step comprising
   storing a flag value in response to the result of the visibility determination of the object.

9. The method of claim 1, wherein the central processing unit:
   performs the determining visibility step; and
   performs a further step comprising
   storing a flag value in response to the result of the visibility determination of the object.

10. The method of claim 1, further comprising:
    receiving a conditional rendering termination command from the central processing unit;
    subsequently to receiving the conditional rendering termination command, receiving a second rendering command; and
    executing the second rendering command regardless of the flag value.

11. A graphics processing subsystem comprising:
    a first graphics processing unit adapted to receive a flag value resulting from a visibility determination for an object associated with a first rendering command, to receive a conditional rendering initiation command from a central processing unit subsequent to the visibility determination, the conditional rendering initiation command specifying a condition for determining whether the first rendering command will be executed, to retrieve the flag value in response to the conditional rendering initiation command, to receive the first rendering command subsequent to the conditional rendering initiation command from the central processing unit, and to determine whether to execute or disregard the first rendering command in response to the flag value based at least in part on whether the flag value satisfies the condition specified in the conditional rendering initiation command.

12. The graphics processing subsystem of claim 11, wherein,
    the produced flag value is one of at least three flag values available in the determination of visibility; and the first graphics processing unit is adapted to disregard the first rendering command in response to the flag value satisfying a condition.

13. The graphics processing subsystem of claim 11, wherein the first graphics processing unit is adapted to receive a second rendering command subsequent to the conditional rendering command and to execute the second rendering command regardless of the flag value in the event that the second rendering command changes a state of the first graphics processing unit.

14. The graphics processing subsystem of claim 11, wherein the first graphics processing unit is adapted to perform the visibility determination of the object and to store a flag value in response to the result of the visibility determination of the object prior to receiving the conditional rendering initiation command.

15. The graphics processing subsystem of claim 11, wherein,
the flag value is a rendered pixel count; and
the conditional rendering initiation command specifies the condition comprising a threshold pixel count indicating when a rendering command for a partially visible object is to be disregarded.

16. The graphics processing subsystem of claim 11, further including a second graphics processing unit operating in parallel with the first graphics processing unit, wherein the second graphics processing unit is adapted to perform the visibility determination of the object and to store a flag value in response to the result of the visibility determination of the object prior to the first graphics processing unit receiving the conditional rendering initiation command.

17. The graphics processing subsystem of claim 11, wherein the first graphics processing unit is further adapted to receive a conditional rendering termination command from the central processing unit, to receive a second rendering command subsequently to receiving the conditional rendering termination command, and to execute the second rendering command regardless of the flag value.

* * * * *